United States Patent [19]
Gelbart

[11] Patent Number: 5,995,475
[45] Date of Patent: Nov. 30, 1999

[54] TWO DIMENSIONAL LASER DIODE ARRAY USING MULTIMODE LASERS

[75] Inventor: Daniel Gelbart, Vancouver, Canada

[73] Assignee: Cero Products Inc., Burnaby, Canada

[21] Appl. No.: 08/970,081

[22] Filed: Nov. 13, 1997

[51] Int. Cl.[6] .................................................... G11B 7/00
[52] U.S. Cl. ........................................... 369/112; 369/121
[58] Field of Search ............................. 369/44.23–44.24, 369/44.12, 110, 118, 119, 121, 122, 112; 372/50; 359/668, 710; 347/244

[56] References Cited

U.S. PATENT DOCUMENTS

| | | |
|---|---|---|
| 4,743,091 | 5/1988 | Gelbart . |
| 5,161,064 | 11/1992 | Clark et al. . |
| 5,291,329 | 3/1994 | Wakimoto et al. . |
| 5,475,416 | 12/1995 | Kessler et al. . |
| 5,477,259 | 12/1995 | Iwasa . |
| 5,737,300 | 4/1998 | Ota et al. ................................ 369/112 |
| 5,793,783 | 8/1998 | Endriz . |

FOREIGN PATENT DOCUMENTS 621558  1/1997  European Pat. Off. .

*Primary Examiner*—W. R. Young
*Attorney, Agent, or Firm*—Oyen Wiggs Green & Mutala

[57] ABSTRACT

A two dimensional laser diode array consists of rows and columns of individual multimode laser diodes, each diode having a separate collection lens. The array is imaged at a large reduction ratio to achieve high resolution recording. In order to decrease the apparent spacing of the diodes in the scanning direction, the rows are staggered relative to the scan direction. In order to avoid variations caused by the near-field non-uniformity of multimode diodes the final spot generated on the media is an image of the aperture of the collecting lens and not of the diode facet. The larger dimension of this aperture, formed by the diffraction limited direction of the laser diode, is reduced by using anamorphic optics.

13 Claims, 3 Drawing Sheets

TWO DIMENSIONAL LASER DIODE ARRAY USING MULTIMODE LASERS

FIELD OF THE INVENTION

This invention relates to focussing light from an array of laser diodes onto a surface. The invention has particular application in thermal imaging in the infrared ("IR") region of the spectrum.

BACKGROUND OF THE INVENTION

Laser diodes are available as single mode or multimode diodes. Single mode laser diodes are effectively point sources, diffraction limited in their divergence in both axis. Multimode diodes typically have laser junctions in the form of short stripes, typically from 10 to 200 microns long. Multimode diodes are diffraction limited in the direction perpendicular to the junction but have non-diffraction limited divergence in the direction parallel to the laser junction. The emitting aperture of a multimode diode can be a single continuous stripe, a collection of short stripes or even a collection of single mode emitters electrically connected in parallel. All these difference constructions will be referred to as "multimode laser diodes". The diodes can be used in the visible part of the spectrum or in the IR. The term "light" is used here to cover all wavelengths.

Two dimensional laser diode arrays have been used for high resolution recording both in the optical data storage and laser plotting fields. These arrays make better use of the field-of-view of the lens than linear arrays. Two dimensional arrays are described in U.S. Pat. Nos. 4,743,091; 5,291,329 and 5,477,259.

All prior art requires a very large de-magnification ratios, typically over 100, to reduce the mechanical pitch of the array to an acceptable high resolution image. This high de-magnification ratio requires the distance between the final imaging lens and the collecting lenses to be typically over 100 times the focal length of the imaging lens. Such a large distance is acceptable for single mode laser diodes, as light from the point sources of single mode laser diodes can be collimated, but is too large for multimode lasers, as light from the spatially extended emitters of multimode laser diodes cannot be collimated and diverges, therefore missing the aperture of the final lens.

A second difficulty using multimode laser diodes is their non-uniform near field pattern. Even if the diodes are equally spaced mechanically, the equivalent emission point can move around by many microns as the near-field pattern changes with aging. This variation in the near-field pattern causes unacceptable banding in the image if the near field of the diodes is imaged onto the recording material. For these two reasons all prior art designs of two dimensional laser diode arrays used for recording had to use single mode diodes. Single mode diodes are more expensive than multimode diodes (for the same output power) and are limited in input power. Most prior art methods of using multimode diodes use multimode optical fibers to direct light from the laser diodes. Coupling to optical fibers causes a large brightness loss.

SUMMARY OF THE INVENTION

It is an object of the invention to enable the use of multimode diodes for high resolution recording using a two dimensional array configuration. A further object of the invention is to create high power and high brightness arrays, taking advantage of the high power available from multimode laser diodes.

In accordance with the present invention a two dimensional laser diode array is constructed using multimode diodes. The array consists of rows and columns of laser diodes, each diode having an individual collecting lens. All the beams from the diodes are passed through a final imaging lens. Between the imaging lens and the array, one or more optical elements are used and at least one element is anamorphic. An anamorphic element has different magnifications in different directions, for example a cylindrical lens has no magnification in the direction parallel to the axis of the cylinder. The imaging lens is placed to image the apertures of the collecting lenses onto the recording material. Since the aperture of the collecting lens is illuminated by the far field of the multimode diode it is not affected by near field non-uniformity. Even a dark spot on the laser diode facet will not cause far-field non-uniformity. In order to reduce the required de-magnification the final lens is selected to reduce the narrow dimension of the far field spot. Since the ratio of beam divergence in multi-mode diodes can be as high as 5:1 between the fast axis (high divergence direction, perpendicular to laser diode junction) and the slow axis (low divergence, parallel to junction), a lower de-magnification is required to scale the slow axis to the desired size. The far field pattern of the fast axis is de-magnified independently by using an anamorphic element, such as a cylindrical lens, placed between the imaging lens and the individual collecting lenses. The anamorphic element can be, by way of example, a negative cylindrical lens, a beam reducer made of a negative and a positive cylindrical lens or a beam reducer made of two positive cylindrical lenses. Since the fast axis of a multimode diode is also the diffraction limited axis, a nearly collimated beam can be achieved even when a large anamorphic shrinking ratio is used. The combination of lower de-magnification and anamorphic shrinking of the fast axis allows the recording of very small spots while maintaining a very high light collecting efficiency. This makes an optical system according to the invention particularly useful in the printing and medical imaging industries when used to record thermal materials.

DETAILED DESCRIPTION OF THE PREFERRED EMBODIMENT

Figure 1:
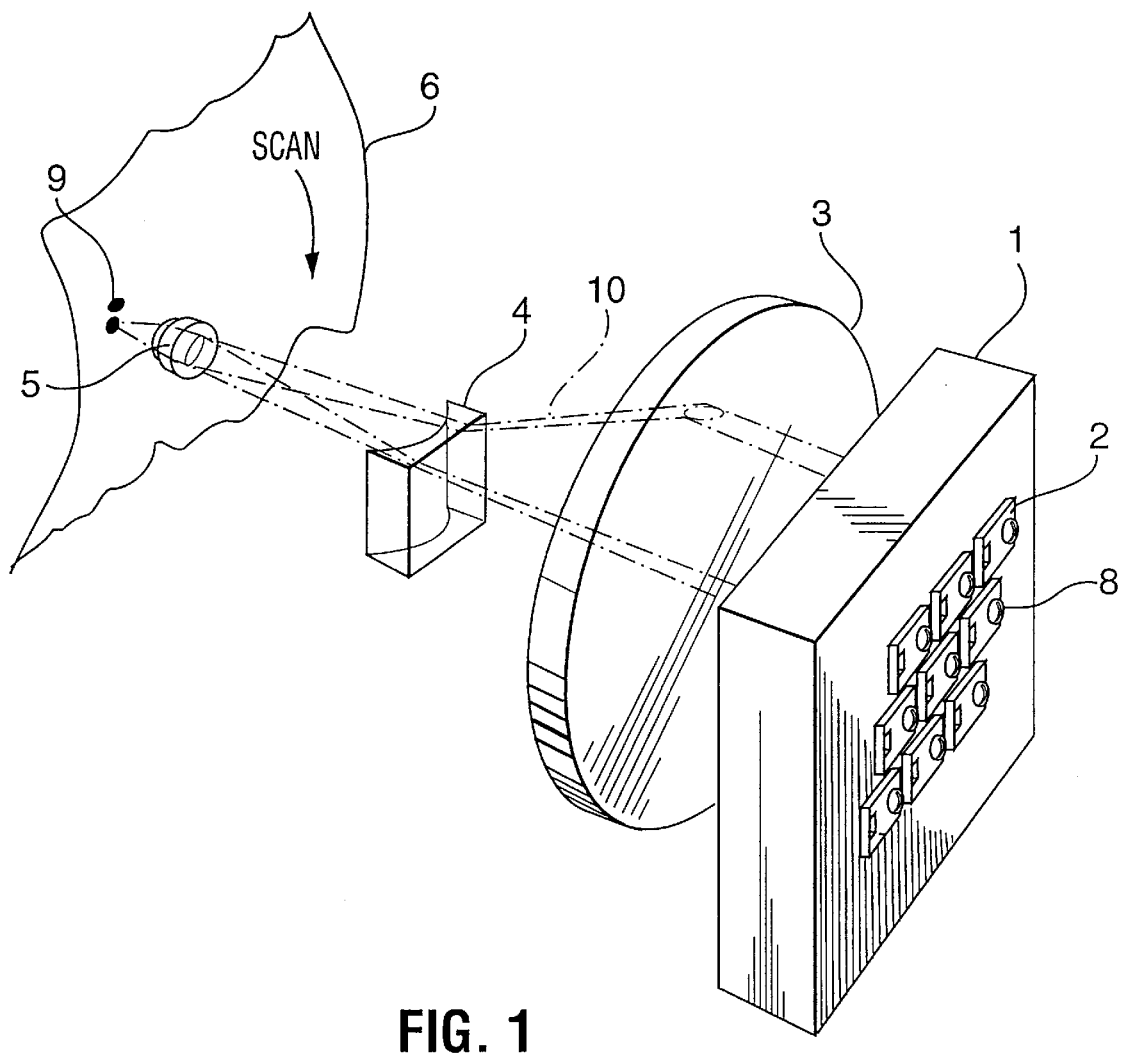
FIG. 1 is a perspective view of the invention.

Referring now to FIG. 1, a two dimensional laser diode array uses rows and columns of multimode diodes 2 mounted on a substrate, or array block 1. The output beams 10 of diodes 2 are aimed to the aperture of imaging lens 5. Lens 5 creates a de-magnified image of array 1 onto recording material 6. The area of recording material 6 is covered by a two dimensional relative movement of array image 9 and material 6. Typically, material 6 is mounted on a rotating drum, drum rotation providing one scan direction while the complete array is translated to provide the second scan direction. These scanning methods are well known in the art and need not be detailed.

Figure 2:
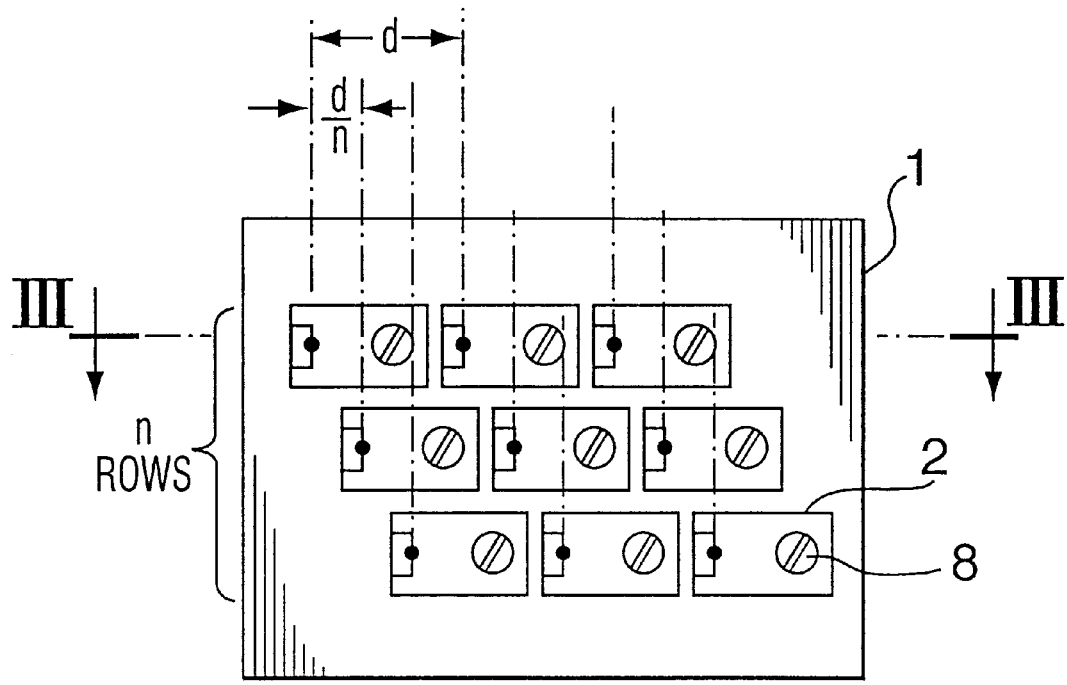
FIG. 2 is a view of the array, showing the effective reduction of the mechanical pitch.

Beams 10 can be aimed at the aperture of lens 5 by curving array block 1, as shown in U.S. Pat. No. 4,743,091 or by using optical means such as lens 3. It is clear that all mechanical and optical means of pointing beam 10 to lens 4 are equivalent as far as the invention is concerned. At least one anamorphic element 4 is placed between array block 1 and lens 5. Referring now to FIG. 2, a two dimensional array of "n" rows by "m" columns of multimode laser diodes 2 is mounted on block 1. Illustratively a 3×3 array is shown, however, it is clear that larger arrays are possible and advantageous. The m columns have a horizontal spacing "d". The apparent spacing of the diodes in the scan direction will be d/n. By the way of example, the diodes in first row appear at a distance "d" from each other when viewed from the scan direction. The second row is offset by an amount of d/3 when viewed from the scan direction. The third row is offset by 2d/3. Thus the diodes appear at a spacing of d/3 when viewed from the scan direction. This spacing is further de-magnified by the subsequent optics and reduced to the desired pitch on the recording material (typically 5 to 25 microns).

Figure 3:
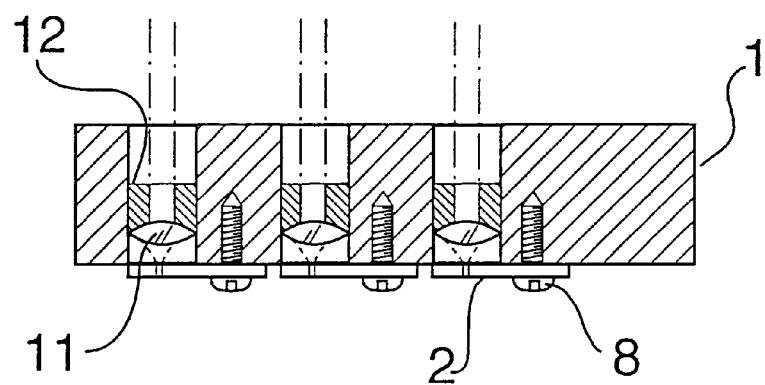
FIG. 3 is a cross-section of the array shown in FIG. 2.

Referring now to FIG. 3, which is a cross-section of the array block 1 shown in FIG. 2, a collecting lens 11 is held in place by tube 12 in front of each diode 2. The collecting lens 11 is a high NA (numerical aperture) short focal length lens designed to collect almost all the light from laser diode 2. Diode 2 can be moved in two dimensions by loosening mounting screw 8 in order to align it with lens 11. The third dimension (focus) is achieved by sliding tube 12 and lens 11 in and out of block 1. When a curved array block 1 or optical curving (lens 3 in FIG. 1) is used, diode is centered on lens 11. In order to eliminate the need for curving, diode 2 can be adjusted slightly off-center relative to lens 12. This will steer beam 10. Since lens 11 has a very short focal length, typically under 5 mm, a slight shift in diode 2 will provide the required steering. For example, if the imaging lens 5 is 300 mm from the collecting lens 11, and a f=3 mm focal length lens is used as a collecting lens, a mere 0.1 mm shift in lateral position of diode 2 will move beam 10 about 10 mm at the plane of the imaging lens. This eliminates the need for lens 3 at the expense of slightly reduced optical performance.

Figure 4A:
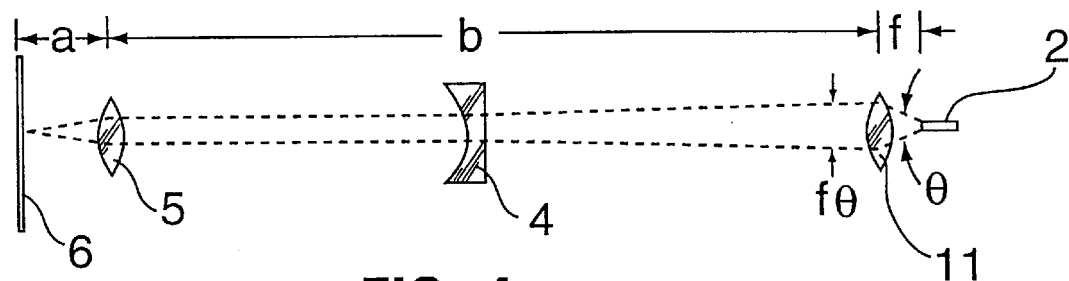
FIG. 4 (subparts a and b) are the optical layout of the invention in top and side view.
Figure 4B:
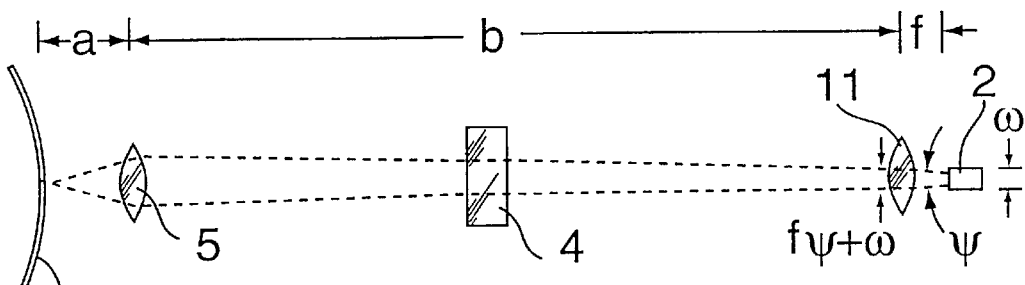
Figure 5:
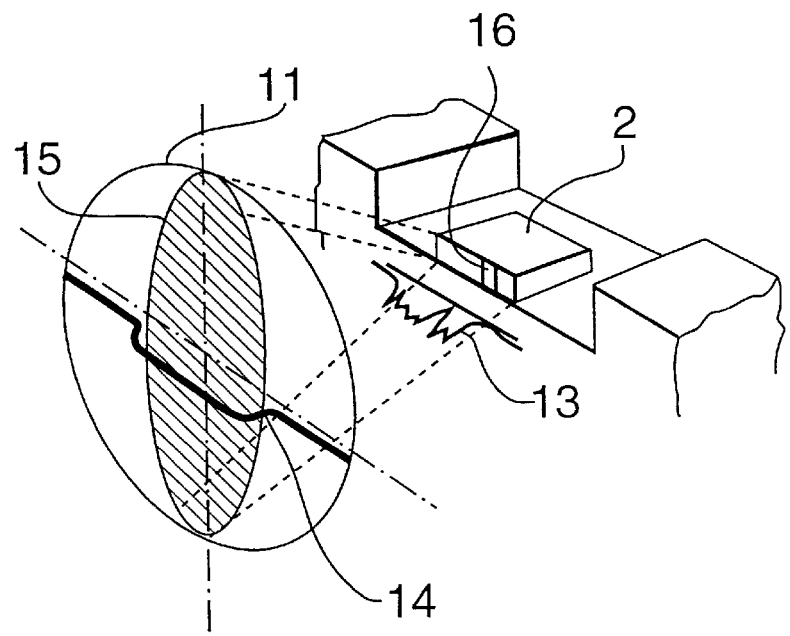
FIG. 5 is a perspective view of the near and far field emission pattern of a multimode laser diode.

Referring now to FIG. 4 and FIG. 5, the optical layout of the invention is shown. The emission area of diode 2 can have defects or intentional gaps 16 (in FIG. 5). These defects can also appear as diode ages. Because of this the invention images the far field 15 of the diode 2, typically at the aperture of lens 11, instead of the near field. For a typical multimode diode utilized in the inventions, the width of the emission area is 10–100 microns while the divergence is about 10°×40° FWHM (Full Width Half Maximum). Using a focal length of f=3 mm for lens 11, the dimensions of far field laser spot 15 will be about 0.5×2 mm and each point on far field spot 15 will be illuminated by all parts of the emission area of diode 2. This makes defect 16 invisible at spot 15. Should the effective center of emission for diode 2 shift, spot 15 will shift by a much smaller amount. Imaging far field spot 15 into the recording media instead of the near field of the laser creates a smooth and stable exposure 14 instead of irregular and unstable pattern 13. Graphs 13 and 14 represent a measured scan through the beam of laser 2.

Referring now to FIG. 4, the optical layout of the inventions in its simplest form is shown. Optical curving lens 3 (FIG. 1) is omitted as it is not essential to the operation of the invention. In its simplest form a single channel consists of laser diode 2, collecting lens 11, anamorphic lens 4 and imaging lens 5. The size of the laser spot 15 (FIG. 5) on the aperture of lens 11 is approximately fθ in the direction of the large divergence and fψ+w in the slow divergence axis, when θ and ψ are the divergence angles, f=the focal length of the collecting lens and "w" the width of the laser junction. Since w<<fψ,ψ<θ, then fψ+w<fθ. Because of this the dimension fψ+w requires less demagnification for a given recorded mark. Lens 5 is selected to provide this de-magnification. In FIG. 4-b, the cylindrical lens 4 has no effect on magnification. Mark size in FIG. 4-b: (a/b)(fψ+w). (a width of fψ+w is reduced by a/b). Lens 11 is creating an image of the junction on the aperture of lens 5 (for maximum light collection). This requires lens 5 to have an aperture larger than (b/f)w (this relationship is an approximation, since the distance from laser to lens 11 is slightly larger than f). Without cylindrical lens 4 the mark size on recording material 6 in FIG. 4-a would be (a/b)fθ. This is too large for most applications. An anamorphic element 4 can reduce the magnification in the plane of FIG. 4-a without affecting FIG. 4-b. This can be done in numerous ways, by the way of example:

1. A negative cylindrical lens located near each collecting lens.

2. A negative cylindrical lens common to all beams.

3. A beam reducer made of two positive cylindrical lenses and placed near imaging lens.

4. A beam reducer made of one positive cylindrical lens and one negative cylindrical lens, placed near the imaging lens.

It should be noted that replacing lens 4 by a spherical lens, in order to reduce size in both dimensions, is not possible as it will increase the beam size at the aperture of lens 5 in FIG. 4-b, causing light loss.

The embodiment shown in FIG. 4 is the simplest as it has the lowest number of optical elements. A beam reducer consisting of one positive and one negative cylindrical lens, placed near the imaging lens 5, provides the best optical performance. Because the anamorphic element is active only in the dimension in which the laser diode is diffraction limited, there is a large degree in flexibility in the design as the diffraction limited dimension can be easily focused into the aperture of lens 5 and the majority of the light collected. Any attempt to reverse the axis and place the beam reducer in the other axis will trade-off image size and collection efficiency, as the degree of freedom in the non diffraction limited axis is much smaller.

EXAMPLE 1

By the way of example an 8×8 array using 64 multimode diodes (SDL 2320-C, from SDL, San Jose, Calif.) has the following parameters:

Diode emitter: 1×40 μm, 600 mW, 830 nm, θ=35°, φ=10° (FWHM)

Collecting lens: f=3.1 mm, NA=0.68, PMO part number 350330 from Geltech-PMO (Orlando, Fla.).

Imaging lens: f=6.25 mm, NA=0.4, PMO part number 350110.

Cylindrical lens: f=−50 mm, Melles-Griot part number 01LCN129 from Melles-Griot (Irvine, Calif.)

Array Grid: 8 mm Horizontal×10 mm Vertical, giving equivalent pitch of 8 mm: 8=1 mm in scan direction, curved with a radius of R=300 mm.

Reduction ratio: 50:1 (a=6.375 mm, b=318.75 mm), giving spot pitch of 1 mm:50=20 μm on recording material.

Spot size before reduction (on collecting lens):
1.9 mm (Horizontal)×0.6 mm (Vertical). Without cylindrical lens the horizontal spot would be 1.9:50=38

μm. By placing cylindrical lens about 100 mm from imaging lens, this is reduced to about 20 μm in the horizontal direction, giving a spot size of about 20 μm×12 μm. Collecting lens is re-focused for narrowest horizontal width on the aperture of imaging lens 5. The overall pitch of the array is reduced at the same time from an equivalent pitch of 1 mm to about half of this value.

Light Collecting Efficiency: About 90% diode to recording surface (all optics are AR coated for 830 nm).

Output Power: 64×0.6 w×0.9=34 w.

As can be seen from this example, a highly efficient design having high output power, sharp spots and small overall size (about 65×80×230 mm is achieved. While the example used refractive optics it is obvious that other type of optics such as reflective or diffractive optics can be used in this invention to achieve the same function. For example, a lens can be replaced by a curved mirror.

EXAMPLE 2

All parameters are identical to example 1 with the exception that the single negative cylindrical lens is replaced by an array of 64 small negative lenses, each one placed in front of a collecting lens. Each negative lens has a focal length of −10 mm (Melles Griot part number 01 LCN 427) and is placed about 20 mm in front of the corresponding collecting lens. Collecting lenses are re-focused for smallest spot on aperture of lens 5.

What is claimed is:

1. A laser diode array for recording information on the surface of a light sensitive material comprising:

a two dimensional array of multimode type laser diodes mounted on a substrate, each laser diode having a separate light collecting lens and each said collecting lens directing the light from each one of said diodes onto a common imaging lens, said imaging lens imaging a point not revealing a near field structure of said diodes and forming an array of spots in the form of a reduced image of said array on said material; one or more intermediate optical elements placed between said imaging lens and said array of laser diodes, said intermediate elements including at least one anamorphic optical element.

2. A laser diode array as claimed in claim 1 wherein said array of laser diodes comprises of a plurality of rows and columns of said laser diodes, each one of said rows being offset relative to the previous row in the direction of the rows by an amount less than the spacing of the columns.

3. A laser diode array as claimed in claim 1 wherein said anamorphic element is shared by all laser diodes.

4. A laser diode array as claimed in claim 3 wherein the anamorphic element contains at least one cylindrical optical surface.

5. A laser diode array as claimed in claim 1 wherein each laser diode is equipped with a dedicated anamorphic element.

6. A laser diode array as claimed in claim 5 wherein the anamorphic elements are cylindrical lenses.

7. A laser imaging device comprising:

a) a plurality of multimode laser diodes arranged in a two dimensional array, each of the laser diodes comprising a light source, each light source having a fast divergence axis and a slow divergence axis;

b) a plurality of collecting lenses, one of the collecting lenses associated with each of the laser diodes, each of the collecting lenses having an aperture, each of the collecting lenses providing a far field image of the light source of the corresponding laser diode, the far field images having a larger dimension and a smaller dimension;

c) an imaging lens, the imaging lens located to image the far field images of the light sources as an array of spots onto a recording material; and, d) an anamorphic element located in an optical path between the light sources and the recording material so as to de-magnify the larger dimension of the far field image.

8. The laser imaging device of claim 7 wherein the anamorphic element comprises a negative cylindrical lens.

9. The laser imaging device of claim 7 wherein the far field image is in the aperture of the collecting lens.

10. The laser imaging device of claim 9 wherein the collecting lens images the light source of the corresponding laser diode on an aperture of the imaging lens.

11. The laser imaging device of claim 7 wherein the recording material is on a rotatable drum and the laser diodes are oriented so that the larger dimension of the far field image is substantially parallel to an axis of rotation of the drum.

12. The laser imaging device of claim 7 wherein the two dimensional array comprises a plurality of rows of equally spaced laser diodes and the rows are offset relative to one another.

13. The laser imaging device of claim 12 wherein each row of the two dimensional array has the same number laser diodes as there are rows in the two dimensional array.

* * * * *